United States Patent
Kawamura et al.

[11] 4,099,846
[45] Jul. 11, 1978

[54] VARIABLE MAGNIFICATION LENS SYSTEM

[75] Inventors: Naoto Kawamura, Inagi; Akira Tajima, Kawasaki; Katsumi Tanaka, Tokyo, all of Japan

[73] Assignee: Canon Kabushiki Kaisha, Tokyo, Japan

[21] Appl. No.: 719,389

[22] Filed: Sep. 1, 1976

[30] Foreign Application Priority Data

Sep. 8, 1975 [JP] Japan .............................. 50/108635

[51] Int. Cl.² ............................................. G02B 15/14
[52] U.S. Cl. ................................................. 350/186
[58] Field of Search ............................. 350/184, 186

[56] References Cited
U.S. PATENT DOCUMENTS

| 3,143,590 | 8/1964 | Higuchi | 350/184 |
| 3,632,188 | 1/1972 | Nakamura | 350/186 |

Primary Examiner—Conrad J. Clark
Attorney, Agent, or Firm—Toren, McGeady and Stanger

[57] ABSTRACT

In a variable focus objective an axial air space between a negative front lens and a positive rear lens component is variable for zooming. The first component is movable for focusing independently of the rear component and provided with a variable air space defined therein to facilitate focusing down to short object distances while preserving high grade imagery for close objects throughout the zooming range and assuring a good uniformity of image quality throughout the entire image region even at the full open aperture.

2 Claims, 40 Drawing Figures

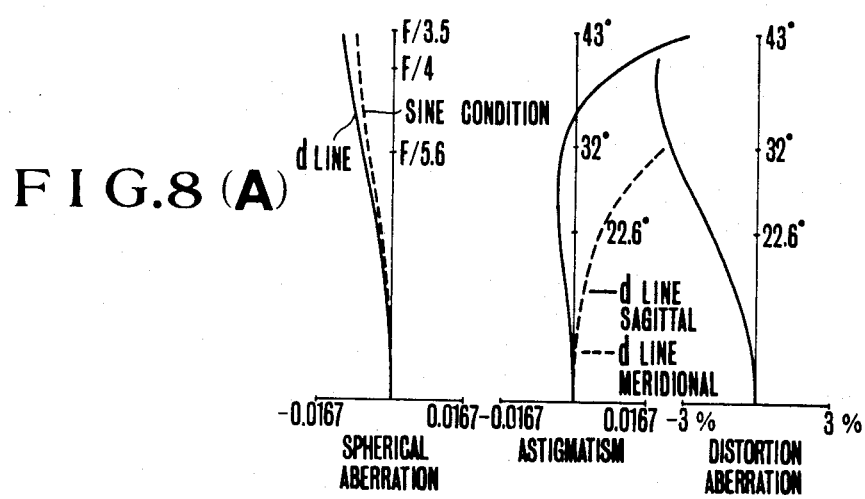
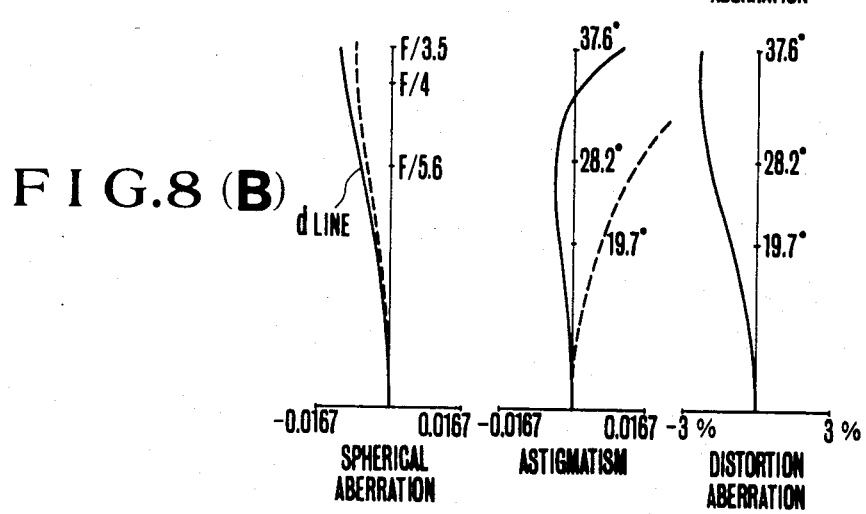
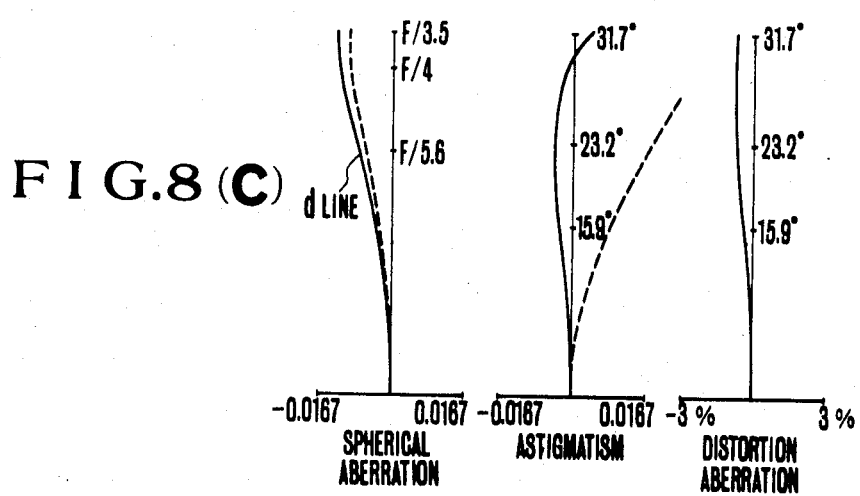

F I G. 13
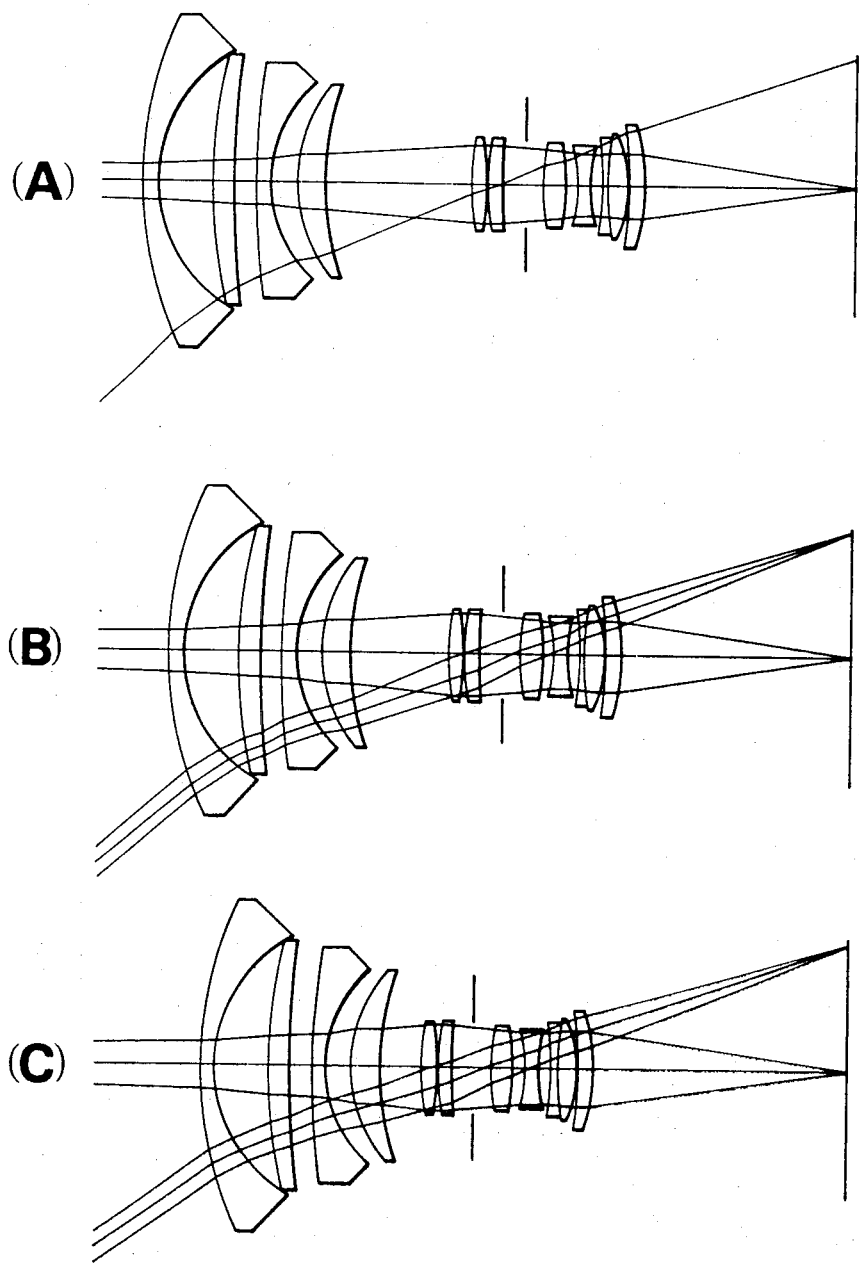

VARIABLE MAGNIFICATION LENS SYSTEM

BACKGROUND OF THE INVENTION

This invention relates to variable magnification optical systems in which a front lens component having negative focal length is movable, for focusing, relative to a rear lens component having positive focal length, and an axial air separation between the front and rear components is variable to effect variation of the focal length of the overall optical system, and more particularly to an improvement of such an optical system which provides for correction of aberrations throughout the zooming and focusing ranges.

FIG. 1 schematically shows a mechanical-compensated variable magnification objective optical system to which the present invention is applicable. From front to rear in the direction in which light enters the optical system from the object end, the system is essentially composed of a first lens component 1 of negative refractivity and a second lens component 2 of positive refractivity. Both components are axially movable in differential relation to each other and to a focal plane 3 at which an image of continuously variable size of an object located at a fixed distance from the system is formed. This variable focus objective lens is, because of its being of inverted telephoto type, advantageous for increasing the back focal length and the image angle and therefore suited for use in a still camera and also as a super wide angle zoom lens for a cinematographic camera and a television camera.

To focus the aforesaid type variable focus objective lens from an infinitely distant object to a close object, an independent forward axial movement is imparted to the first lens component 1 alone. With the varifocal objective lens having this focusing provision set for an object at a finite distance, however, it is proven that the zooming movement of the first and second components results in some image shift due to the introduction of the focusing movement of the first component to the zooming movement. Although the amount of image shift is usually so small as to fall within the depth of field, this conventional focusing method gives rise to an aberrational problem which becomes serious when the lens system is focused down to an extremely short object distance. This aberrational problem is generally encountered in a lens system consisting of a divergent front and a convergent rear lens component to increase the image angle thereof, as the astigmatism is increased with increase in the axial air separation between the front and rear components to result in a large degree of over-correction of field curvature. In varifocal objective lenses of the type described, therefore, the forward movement of the first lens component 1 for focusing to shorter object distances causes an increase in the axial air separation between the first and second components 1 and 2, resulting in an increased variation of astigmatism during zooming. This is true, though to lesser extent, in an alternative focusing method in which all the zoom control components namely, components 1 and 2 are axially moved in unison relative to the focal plane 3 to effect focusing. Even in this latter method, however, the astigmatism tends to vary to a considerable extent during zooming with the resulting field curvature being overcorrected.

It is known that in order to achieve good stabilization of astigmatism and field curvature throughout the focusing range, it is required to fulfill conditions which will be explained in connection with the following formulae for an object at a finite distance expressed in terms of third-order aberration coefficient.

$$III' = III - Q(V + II^r) + Q^2 I^r$$

$$IV' = IV - Q(V + II^r) + Q^2 I^r$$

wherein
 $I$: the spherical aberration coefficient
 $II$: the coma coefficient
 $III$: the astigmatism
 $IV$: the sagittal field curvature coefficient
 $V$: the distortion coefficient
 $I^r, II^r$: the pupil aberration coefficients
 $Q$: the quantity dependent upon the object distance from the lens system When these formulae are applied to the inverted telephoto type lens system, the final term $Q^2 I^r$ may be treated as negligible because $I^r$ is almost zero, while the second term $Q(V + II^r)$ will have a finite value which is rendered more important when the object distance is decreased, because, although $V$ and $II^r$ are usually positive and negative respectively, the absolute value of $V$ is smaller than that of $II^r$. $Q$ is negative so that $III' < III$; and $IV' < IV$. As a result, the field curvature is over-corrected for an object at a finite distance. A requirement that variation of astigmatism and field curvature be reduced to zero during focusing can be fulfilled when the factor $(V + II^r)$ is zero. In the case of the inverted telephoto type lens, however, it is impossible to realize $II^r = 0$, because the principal plane is situated ahead from the pupil plane with the result that the angle of incidence of a pupil-paraxial ray is larger than the angle of emergence thereof.

According to the prior art, therefore, ordinary variable magnification objective lenses of the inverted telephoto type have been designed unavoidably to provide astigmatism and field curvature which are very perceptible when focused down to short object distances. Moreover, this drawback is intensified by increasing the fack focal length. With a conventional variable magnification objective lens having focusing provision at the front lens component thereof, it is difficult to assure a completely uniform high quality imaging capability, particularly when the provision for a field of wide angle is made, due to the fact that an increasingly large part of an extra-axial pencil of rays is blocked by the peripheral edge of the first lens component as the focusing front component is moved forwards. For this reason, it has heretofore been difficult to decrease the object distance to which focusing is effected to a minimum.

SUMMARY OF THE INVENTION

A general object of the present invention is to provide a variable magnification optical system comprising a first lens component of negative power and a second lens component of positive power and which has overcome the above mentioned conventional drawbacks which are encountered when the focusing is performed by imparting an independent movement to the first lens component.

To achieve this, the first lens component is divided into front and rear parts, both of which are movable for focusing in such a manner that an axial air separation between the front and rear parts is decreased at an almost linear rate with the forward movement of the first lens component relative to the second lens component which is stationary during focusing, or the vice versa, as the front and rear parts are simultaneously moved in the same direction. This makes it possible to focus down to very short object distances without causing deterioration of the image quality particularly due to astigmatism and also to provide for an increased image angle with a minimized diameter of the first lens component while still preventing drop of light intensity in the outer portions of the image as compared with the central portion thereof even at the fully open aperture.

According to one embodiment of the present invention, the rear part of the divergent front first lens component has a negative refractive power, and the absolute value of the focal length of the front part is far larger than those of the focal lengths of the rear part and the secone lens component. In more specific embodiments of the invention, the front part of the first lens component includes at least one negative lens and one positive lens, and the rearmost lens in the front part is positive in power.

This invention is, therefore, concerned in particular with a two-part first lens component movable for focusing with the lens elements which are so constructed and arranged that good stabilization of astigmatism and field curvature with focusing as well as with zooming can be achieved even at an extremely short object distance region without causing undue increase of the other aberrations and variation of the focal length of the overall lens system during focusing, both of which would be otherwise resulted from the fact that when the overall lens system is focused for differing object distances, the front and rear parts are moved in differential relation to each other in the same direction to thereby vary the air space defined therebetween.

BRIEF DESCRIPTION OF THE DRAWINGS

FIGS. 8(A), 8(B) and 8(C) are graphic representations of aberrations of the objective of FIG. 7.

FIG. 13 is block diagrams of a conventional varifocal objective similar in construction and arrangement to the objective of FIG. 9 when focused for infinite object distance, but different therefrom when focused in the position shown FIG. 11.

DETAILED DESCRIPTION OF THE PREFERRED EMBODIMENTS

Figure 1:
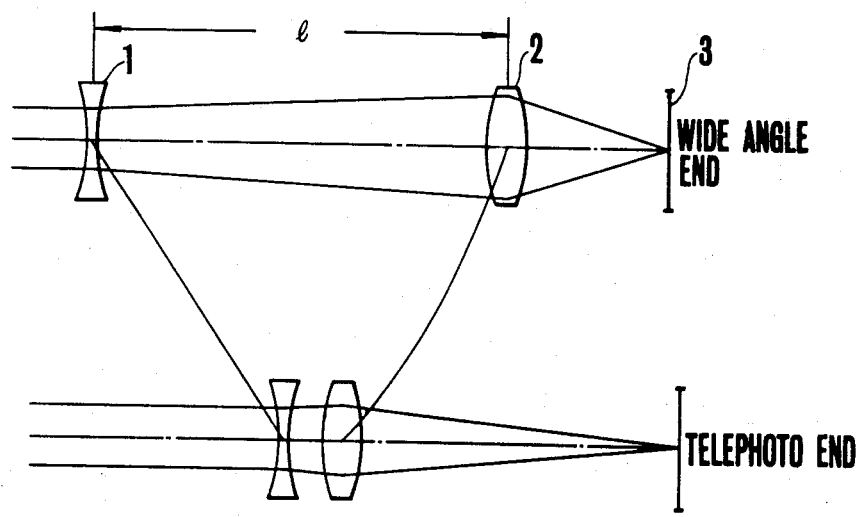
FIG. 1 is a lens block diagram showing the construction and arrangement of the simplified essential components of a variable magnification optical system to which the present invention is applicable in the wide angle and telephoto positions.
Figure 2:
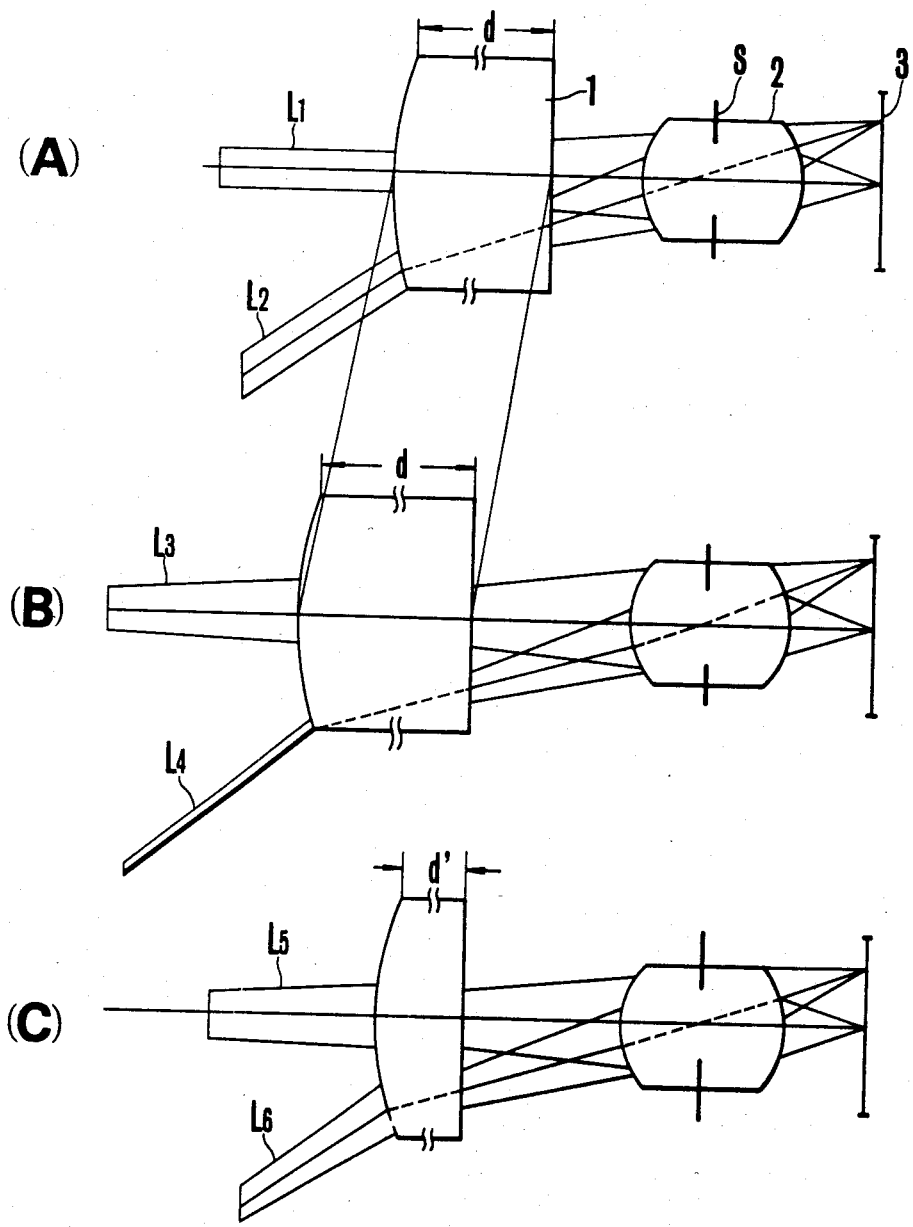
FIG. 2 is diagrams of geometry considered in assuring a completely uniform imaging capability with limitation of the front lens component in diameter to minimum, with FIGS. 2(A) and 2(B) showing a lens system as assumed to have focusing provision according to the prior art, and with FIGS. 2(A) and 2(C) showing a lens system as assumed to have focusing provision according to the present invention.

Referring to FIG. 2, there is shown a predesign for a variable magnification optical system consisting of a first lens component 1 of negative power and a second lens component 2 of positive power and having focusing provision made at the first lens component 1 only according to the invention. FIG. 2(A) shows the infinitely focused position of the first lens component 1 relative to the second lens component 2 which remains stationary during focusing. An oblique pencil of rays $L_2$ with the same finite aperture as that of an axial pencil of rays $L_1$ is incident upon the first lens component 1 having a total thickness of, $d$, at a maximum angle of inclination with respect to the optical axis and is allowed to reach the image plane 3. There a satisfactory image throughout a field of view of given extent is produced. When the lens system is focused for an extremely short object distance by moving the first lens component 1 toward the front without decreasing the thickness of the first lens component 1 as in the prior art, a fraction of, in the example shown in FIG. 2(B) only about one half of, the oblique pencil $L_4$ of the same aperture as that of the axial pencil $L_3$ falls upon the effective surface area of the first lens component 1. Hence a fall off in brightness towards the margin of the illuminated field occurs when the optical system is used at the full open aperture defined by a diaphragm or stop S. With the optical system of FIGS. 2(A) and 2(B) assumed to focus in a known manner, therefore, it is necesssary to increase the diameter of the first component 1 so that the image at the focal plane 3 will be of approximately uniform brightness throughout the entire field of view. This requirement becomes severe when the extent of the field of view is increased up to the field of supper wide angle. According to the prior art, therefore, it has been difficult to provide an optical objective of the zoom type with a large image angle while keeping the bulk and weight of the first lens component movable for focusing in easily manageable proportions to those of the complete objective.

According to the present invention, the first component 1 is provided with a variable air space positioned within a specified range of location so that when the optical system is focused from an infinite object distance to an extremely short object distance by moving the first component 1 to the front, the thickness of the first component 1 is decreased "d" to "d'" as shown in FIGS. 2(A) and 2(C). Then, an oblique pencil $L_6$ under a maximum angle of inclination which has the same aperture as that of an axial pencil $L_5$ is allowed to pass through the first component 1 and the aperture of diaphragm S to the focal plane 3.

The location of such variable air space in the first component 1 must be determined by taking into account the following requirements. The main factor causing deterioration of the image quality by the forward focusing movement of the first component 1 is the over-correction of field curvature which is intensified to a larger degree as the optical system is zoomed to the wide angle region. In order to assure a completely uniform high quality imaging capability throughout the entire image region even when the optical system is focused down to very short object distances, therefore, it is necessary that this over-corrected field curvature must be compensated without affecting other aberrations such as spherical aberration, coma and distortion. A solution for this compensation is that the position of the aforesaid air space is restricted to such a location that the height of incidence of an oblique pencil of pupil-paraxial rays, $\bar{h}$, on the air space is larger in absolute value when zoomed in the wide angle position than in the telephoto position. In this connection, it is desirable that the value of $\bar{h}$ be varied almost linearly with variation of the focal length of the overall optical system to assist in the stabilization of aberrations during zooming. Another requirement is that, as an axial pencil of an angular extent from an object point which lies on the optical axis of the lens system passes through the above-identified air space, with its rays inclined at angles with respect to the optical axis, the position of the air space must be adjusted so that the angles can be reduced to a minimum. If these requirements are fulfilled, the variation of such air space with focusing does not lead to variation of axial aberrations, for example, spherical aberration, but to the concentration of correction at the oblique aberrations occurring when zoomed to the wide angle position. Hence field curvature and astigmatism can be advantageously compensated for, and also the focal length of the overall optical system does not vary during focusing. If the variable air space is otherwise located, the image quality will be reduced at the central portion of the image, and further the variation of aberrations during zooming is increased to a very large extent.

The variable magnification objective optical system according to the present invention comprises a first lens component of negative power and a second lens component of positive power which remains stationary during focusing, both of the first and second components being movable for zooming, and the first component being divided into front and rear parts of which the rear parts is negative in power and both of which are movable axially but in differential relation to each other to effect focusing to suit differing object positions, and fulfils the following requirements:

$$-3.0 < \frac{f_1}{f_W} < -1.17 \tag{1}$$

$$0.54 < \frac{l_W}{f_W} < 1.5 \tag{2}$$

$$0.04 f_W < d < 0.3 f_W \tag{3}$$

$$|f_{1F}| > f_W \tag{4}$$

$$|\bar{h}_W| > |\bar{h}_T|; \tag{5}$$

and $\bar{h}$ is a monotone decreasing function of the focal length of the overall lens system
wherein,
  $f_W$: the shortest focal length of the overall lens system;
  $f_1$: the focal length of the first lens component;
  $l_W$: the axial air separation between the first and second lens components occurring when the system is set in the shortest focal length (wide angle) position with object at infinity;
  $f_{1F}$: the focal length of the front part of the first lens component; and
  $\bar{h}$: the average value of the heights of incidence of an oblique pencil of pupil-paraxial rays on the front and rear boundary refracting surfaces of the air space defined between the front and rear parts of the first lens component, W- and T-subscripts indicating the shortest and longest focal length positions respectively.

Conditions (1) and (2) concern the distribution of refractive power between the first and second lens components. When the upper limit of condition (1) is violated, it is more difficult to achieve a high standard of correction of various aberrations and particularly distortion throughout the zooming range. When the lower limit is violated, the bulk and weight of the complete lens system can not be minimized and kept in easily manageable portions proportion, though the aberration correction is simplified. The upper limit of condition (2) is defined from the point of view of facilitating minimization of the overall dimensions of the lens system, while the lower limit is determined to realize an acceptable range of magnification.

Condition (3) facilitates the solution of aberrational problems which are encountered when the lens system is focused for an infinitely distant object. It is found that the first lens component, because of its being of negative power, contributes to the production of positive spherical aberration, negative coma and positive astigmatism to a considerable degree. These aberrations can be compensated for by employing a positive lens element or elements arranged on the object side of the air space an variable with focusing. They are balanced out with those introduced by the positive lens element or elements. When the lower limit of condition (3) is violated, the converging action of the positive lens element can not be rendered fully effective so that a difficult problem of balancing residual aberrations throughout the entire focal range is created. When the upper limit value is exceeded, an over-compensation for the spherical aberration, coma and astigmatism is resulted.

Conditions (4) and (5) are set forth to achieve good stabilization of aberrations during focusing. Of these conditions, condition (4) concerns the selection of that one of the air spaces in the first lens component which can be rendered variable under the condition that the rays of an axial pencil from an object point which lies on the optical axis pass through the selected air space in almost parallel relation to the optical axis. When the first lens component is moved forward to effect focusing down to shorter object distances, the selected air space is decreased in axial length at an almost linear rate relative to the forward movement of the first component. During this focusing operation, the compensation is made only for field curvature provided that condition (4) is satisfied.

Condition (5) is set forth to secure the state of correction of aberrations which have been achieved under conditions (1) and (2) regardless of the introduction of the focusing movement of the first component to the zooming movement of the first and second components with simultaneous variation of the air space in the first component. As the absolute value of the height of incidence of an oblique pencil of pupil-paraxial rays on the variable air space is decreased at an almost constant rate with increase in the focal length of the overall lens system, focusing can be effected down to an extremely short object distance, while still maintaining excellent correction of aberrations throughout the entire range of magnification. This is based on the fact that the aberrations are varied with focusing in almost linear relation to the degree of movement of the first component which is otherwise constructed with no variable air space therein. The linearity of variation of the axial thickness of the air space with the degree of movement of the first component relative to the second component makes it feasible to employ a focusing mechanism of simple construction.

According to a preferred embodiment of the present invention, the front part of the first lens component can be constructed with at least one negative lens element and one positive lens element with the rearmost lens element being positive in power. Two convenient practical examples of the variable magnification objective optical system of the invention represented in FIGS. 3 and 9 may be constructed in accordance with the numerical data given in Tables 1 and 2 respectively, in which the radii of curvature, R, and the axial thicknesses and separations between the successive surfaces, D, along with the indices, N, of the various lens elements for the spectral D line of sodium and their Abbe numbers, V, are all expressed with the corresponding numbers or suffix numbers counted from the front to rear. The minus values of the radii, R, indicate surfaces concave toward the front.

Figure 3:
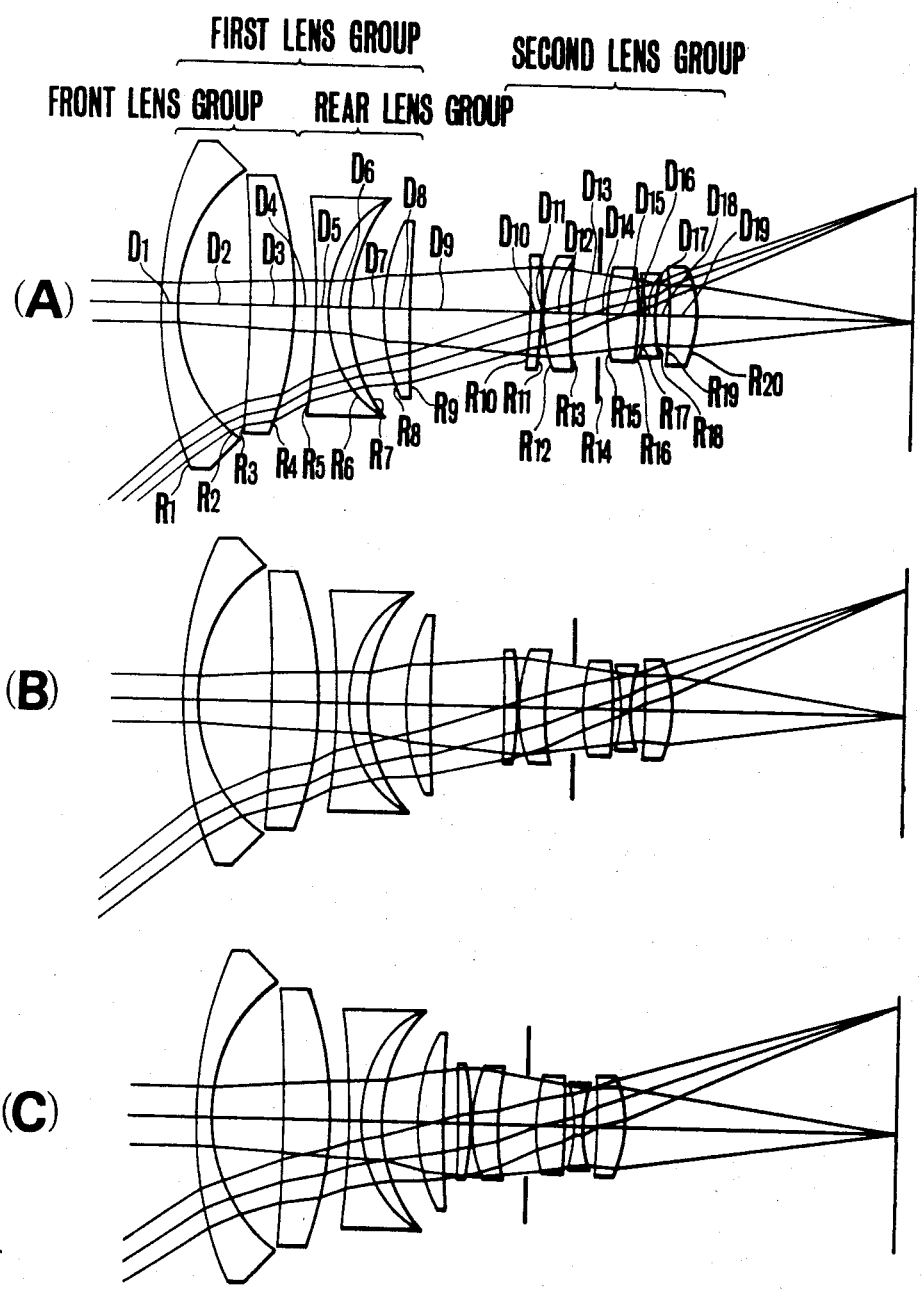
FIG. 3 is block diagrams of one embodiment of a varifocal objective according to the present invention when focused for infinite object distance, with FIG. 3(A) showing the objective when zoomed in the wide angle position, FIG. 3(B) in an intermediate position, and FIG. 3(C) in the telephoto position.
Figure 4:
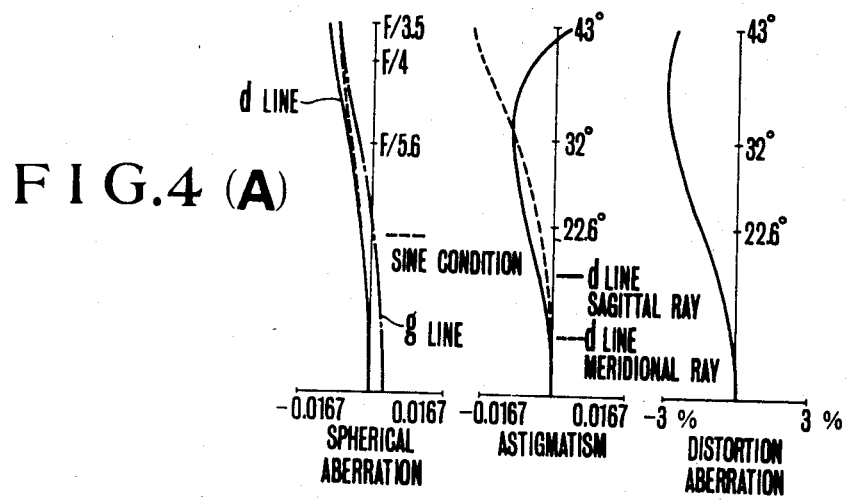
FIGS. 4(A), 4(B) and 4(C) are graphic representations of aberrations of the objective of FIG. 3 when focused for an infinitely distant object and when set in the wide angle, intermediate and telephoto positions respectively.
Figure 4:
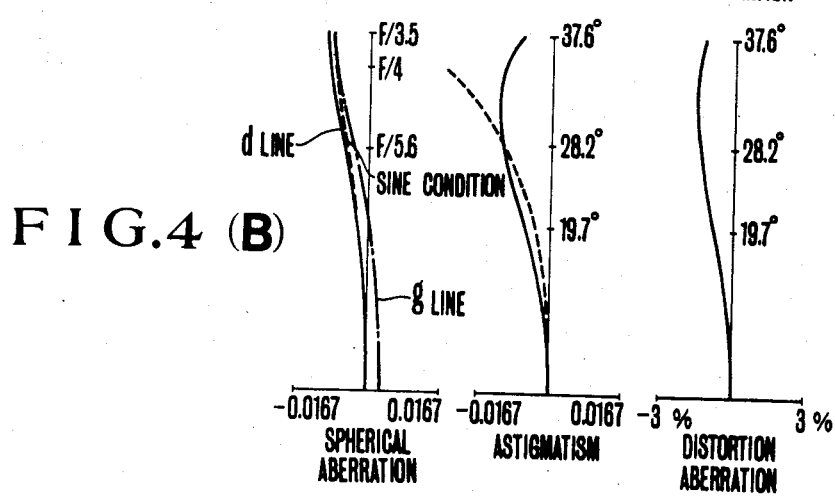
Figure 4:
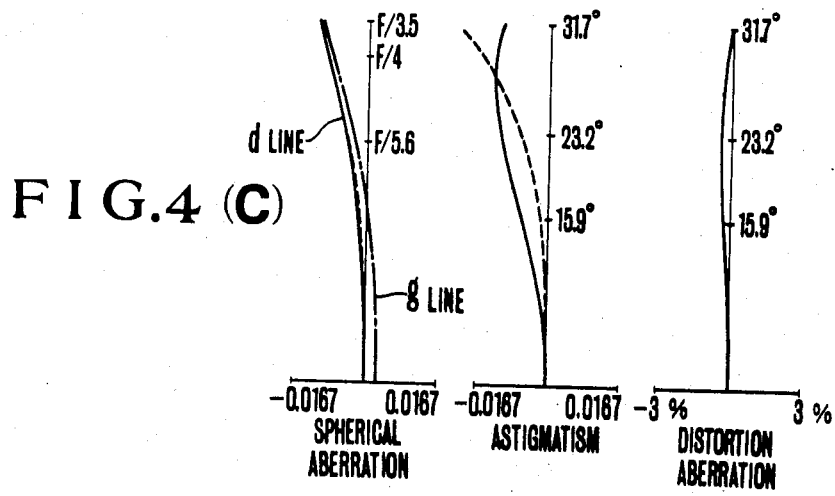
Figure 5:
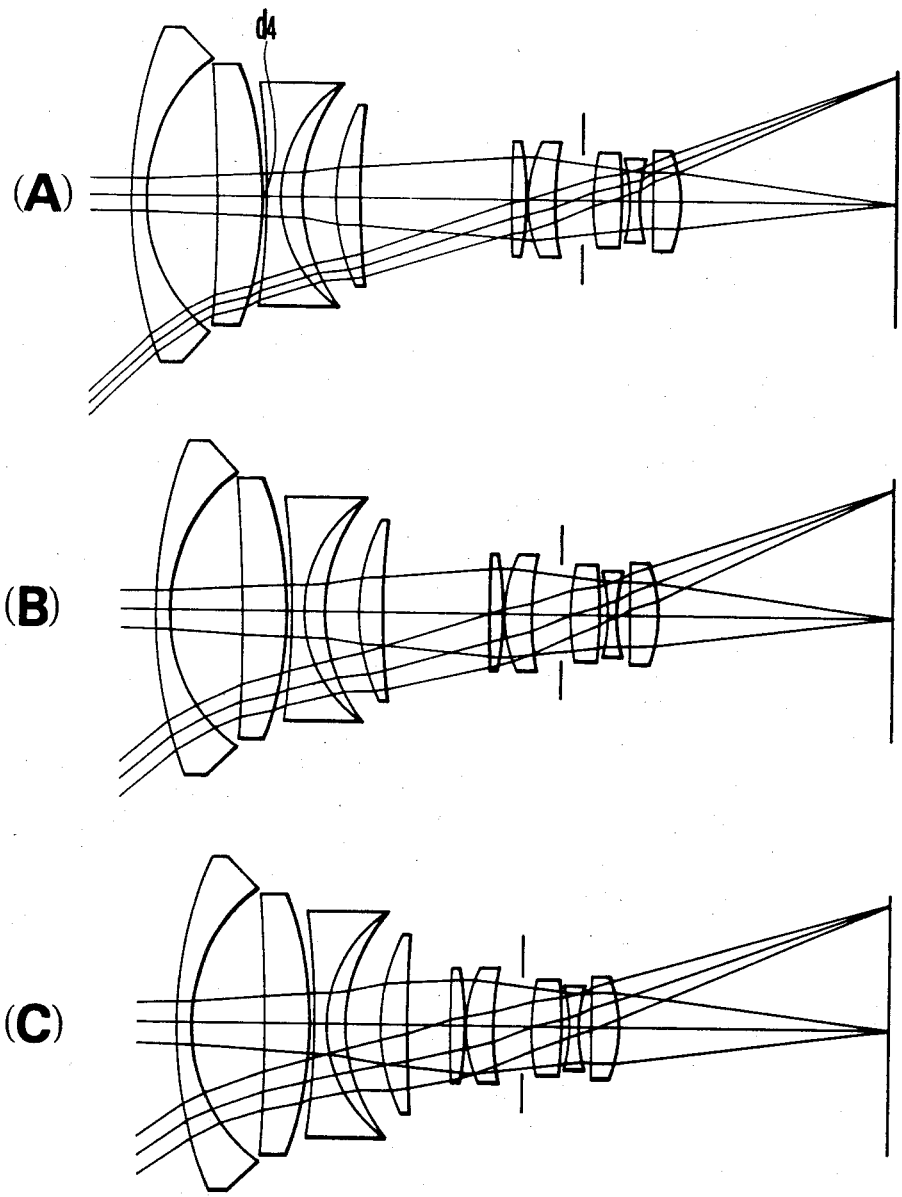
FIGS. 5(A), 5(B) and 5(C) are block diagrams similar to those of FIG. 3 but different therefrom in that the focusing is effected for an extremely short object distance corresponding to a magnification of −0.0777 at the wide angle position.
Figure 6A:
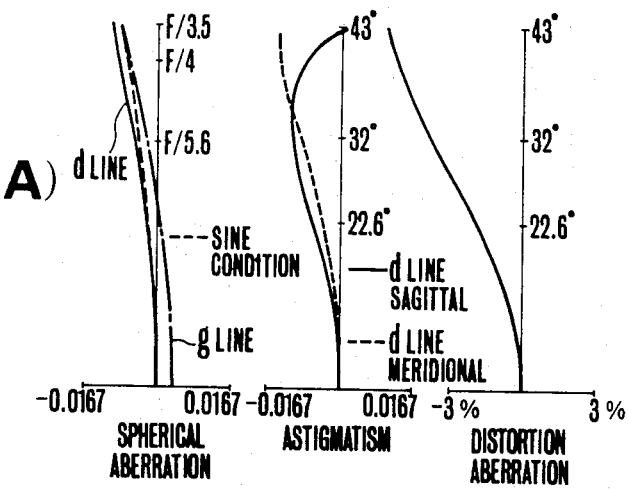
FIGS. 6(A), 6(B) and 6(C) are graphic representations of aberrations of the objective of FIG. 3 when focused in the position shown in FIG. 5.
Figure 6B:
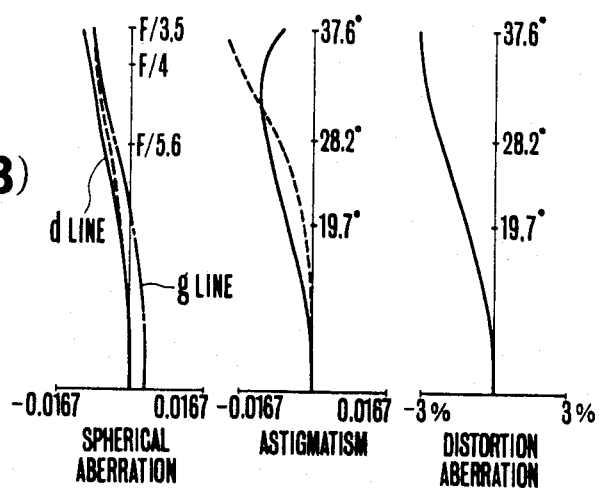
Figure 6C:
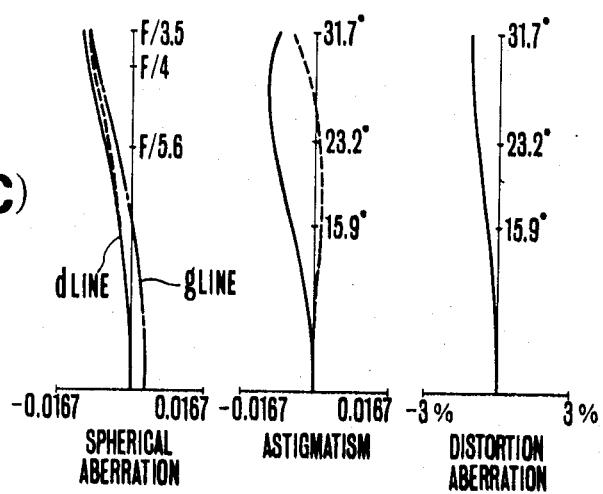
Figure 7:
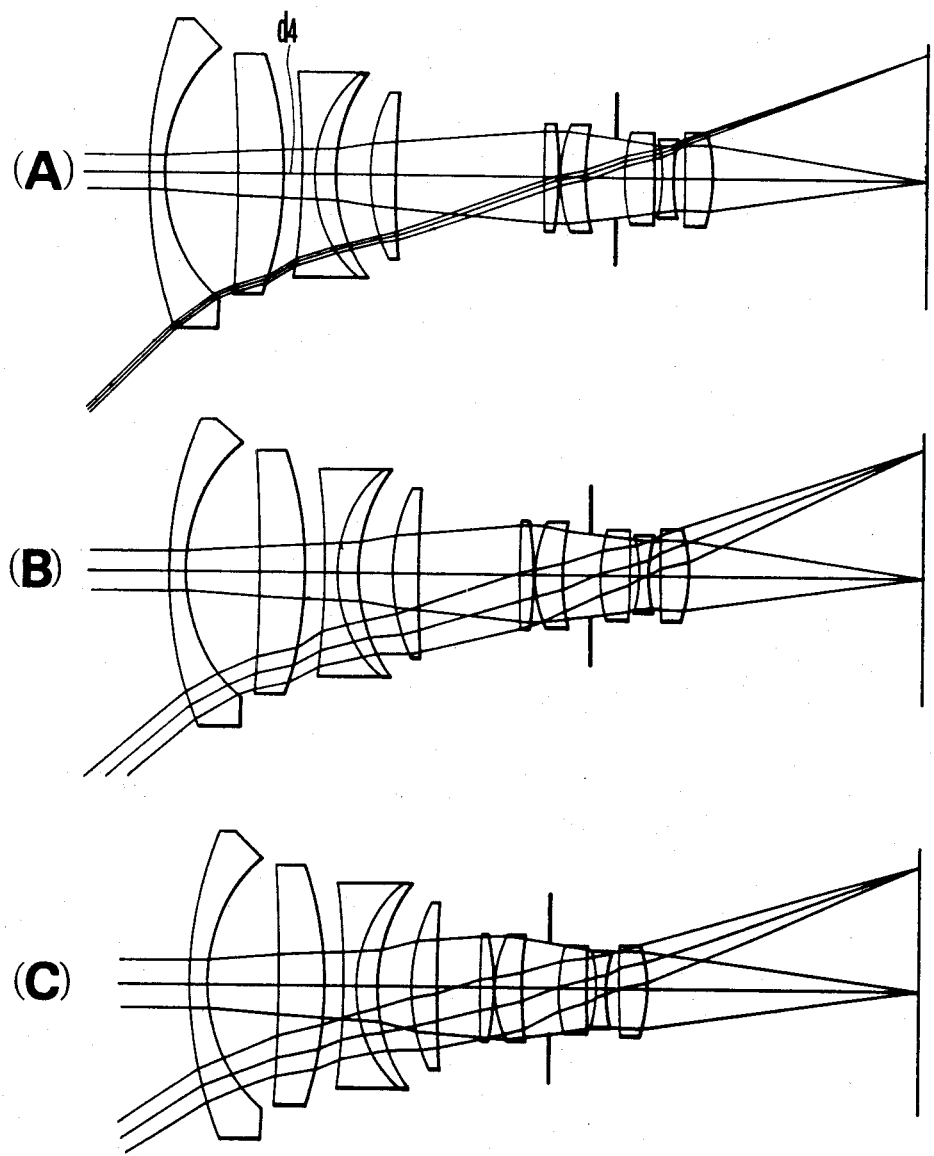
FIG. 7 is block diagrams of a conventional varifocal objective similar in construction and arrangement to the objective of FIG. 3 when focused for infinite object distance but different therefrom when focused in the position shown in FIG. 5.

Aberration correction attained in FIGS. 3 and 5 objective of the invention according to the data of Table 1 is shown respectively in FIGS. 4 and 6, occurring when the objective is respectively focused for an infinitely distant object and for a close object at a distance corresponding to a magnification of −0.0777 at the shortest focal length position or wide angle position. By comparison of FIG. 3 objective with that of FIG. 5, it is to be noted that the air space $d4$ is varied during focusing. The improvement of the objective of the invention with respect to the uniform high quality imaging capability can be well understood by comparison in aberration curves with the conventional objective of FIG. 7 constructed in accordance with the same data of Table 1 but having no variable air space in the first component. FIG. 8 is aberration curves of the conventional objective of FIG. 7. It is evidenced from FIGS. 6 and 8 that the image quality is largely reduced at the outer image portions when the focusing provision of the present invention is not made.

Figure 9:
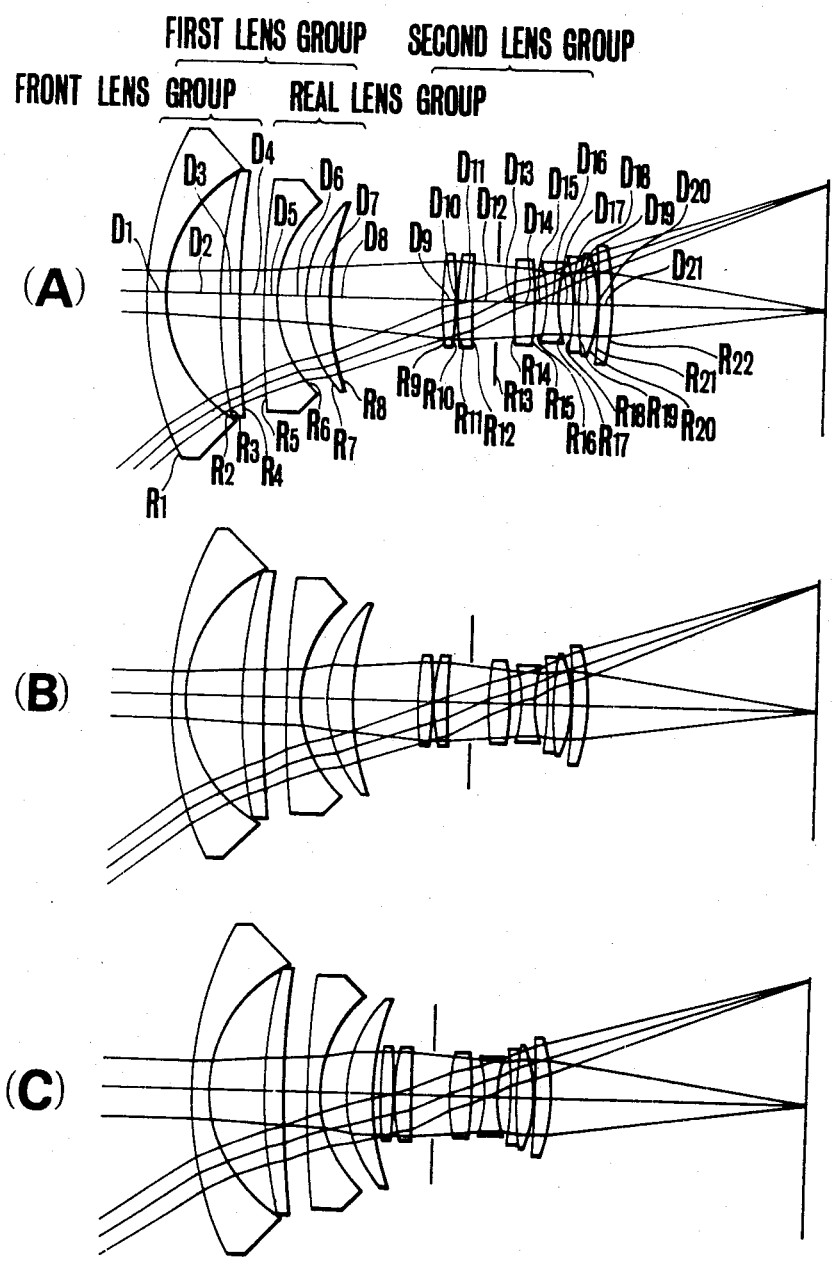
FIG. 9 is block diagrams of another embodiment of a varifocal objective according to the invention when focused for infinite object distance, with FIG. 9(A) showing the objective when zoomed in the wide angle position, FIG. 9(B) in an intermediate position, and FIG. 9(C) in the telephoto position.
Figure 10:
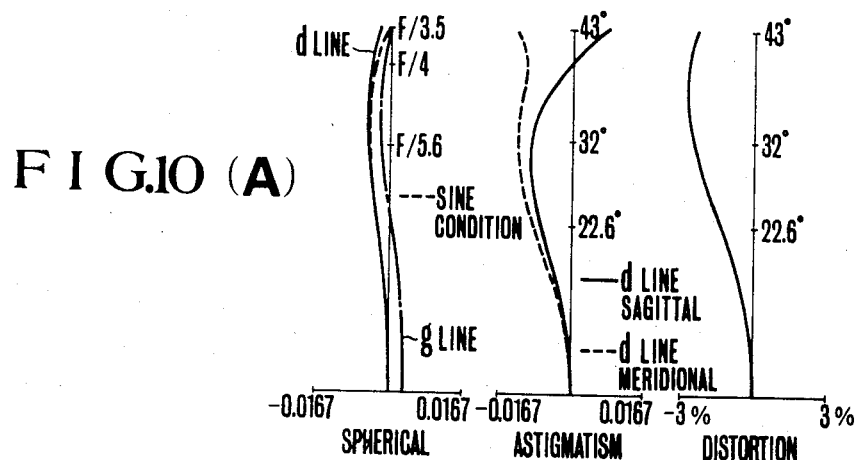
FIGS. 10(A), 10(B) and 10(C) are graphic representations of aberrations of the objective of FIG. 9 when focused for an infinitely distant object and when set in the wide angle, intermediate and telephoto positions respectively.
Figure 10:
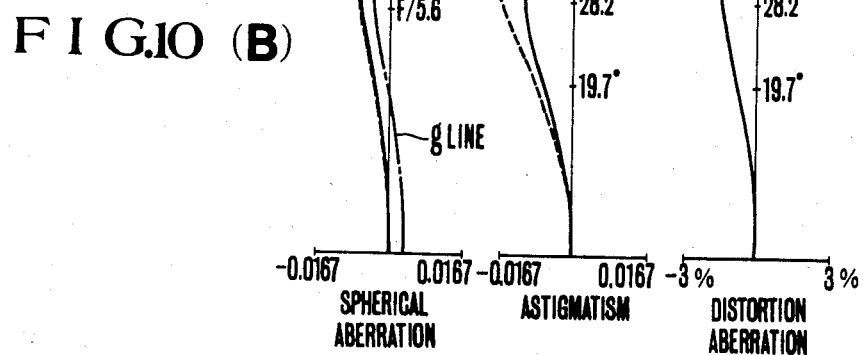
Figure 10:
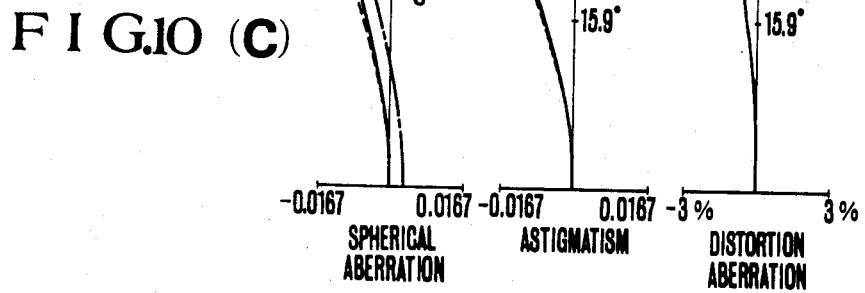
Figure 11:
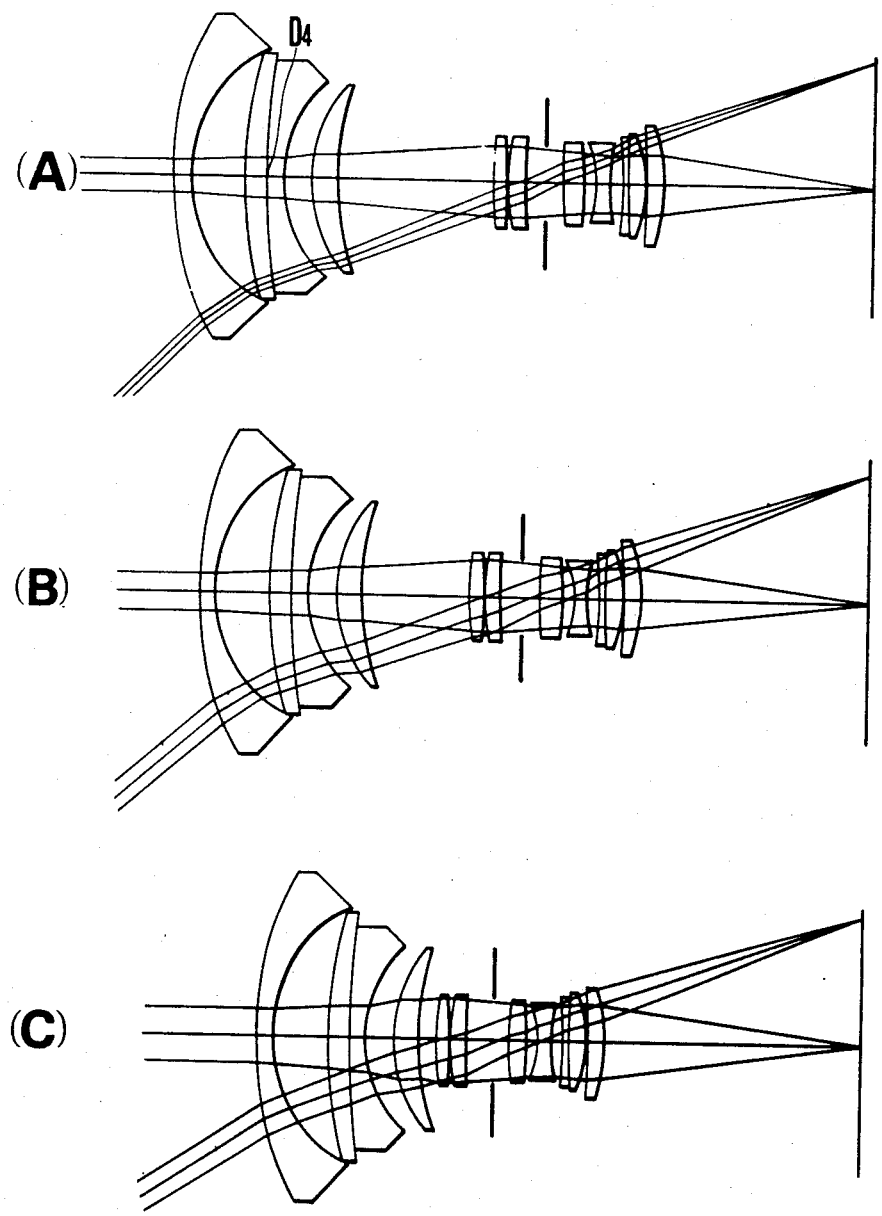
FIGS. 11(A), 11(B) and 11(C) are block diagrams similar to those of FIG. 9 but different therefrom in that the focusing is effected for an extremely short object distance corresponding to a magnification of −0.0750 at the wide angle position.
Figure 12:
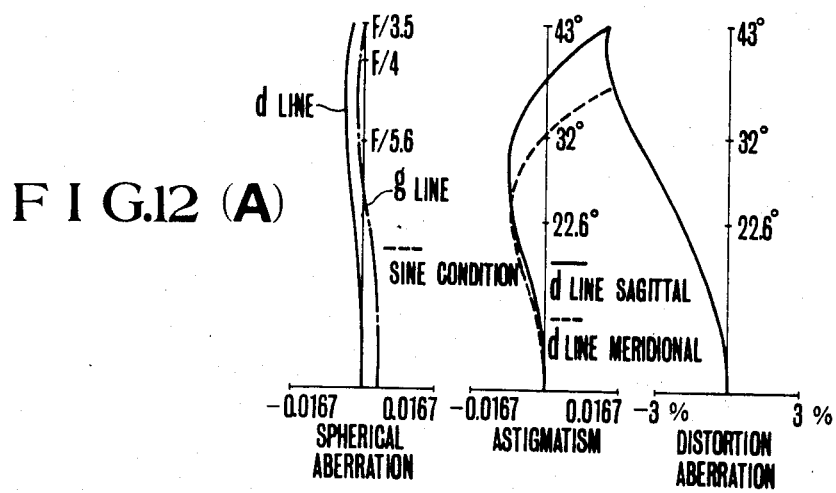
FIGS. 12(A), 12(B) and 12(C) are graphic representations of aberrations of the objective of FIG. 9 when focused in the position shown in FIG. 11.
Figure 12:
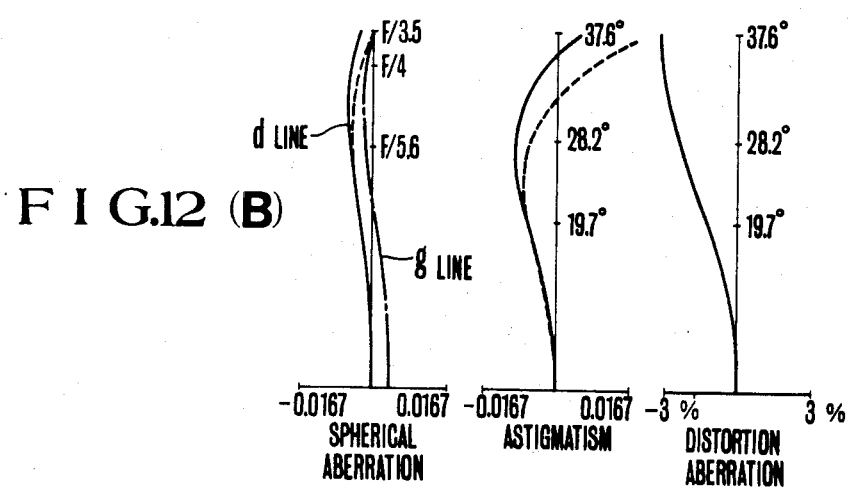
Figure 12:
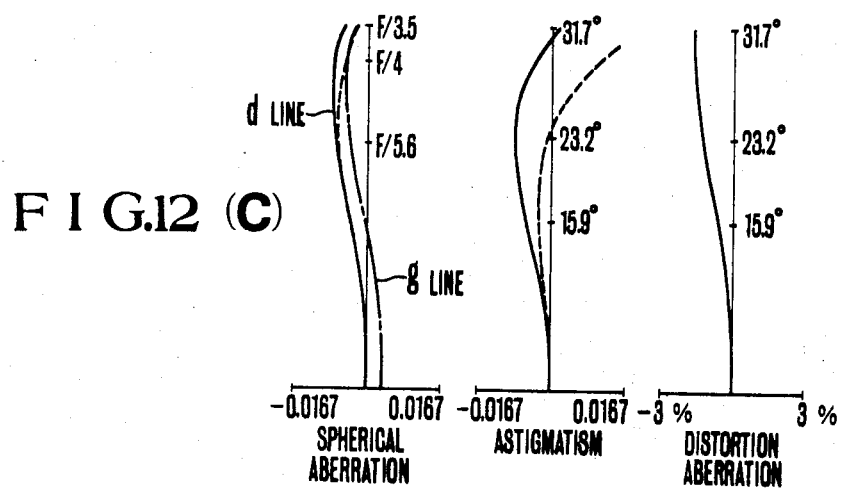
Figure 14:
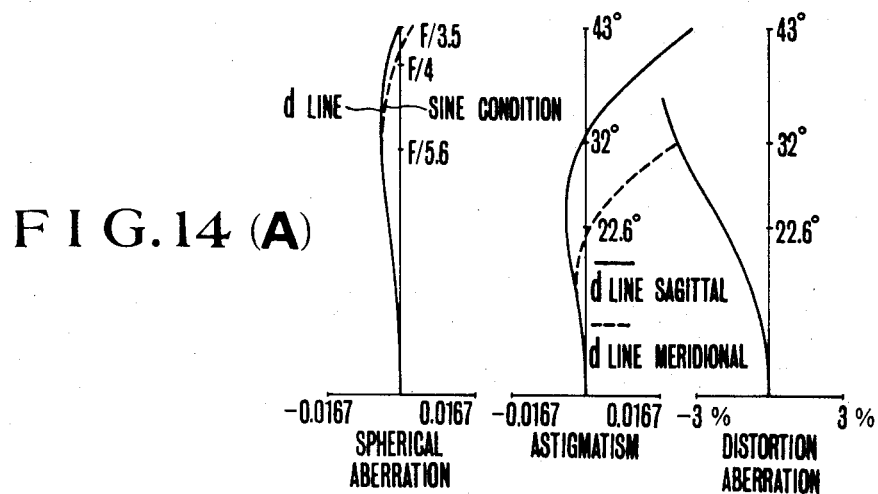
FIGS. 14(A), 14(B) and 14(C) are graphic representations of aberrations of the objective of FIG. 13.
Figure 14:
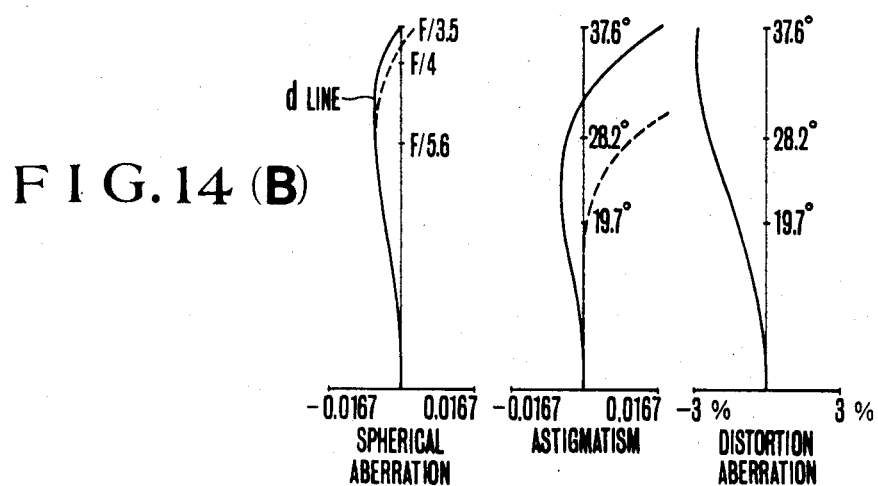
Figure 14:
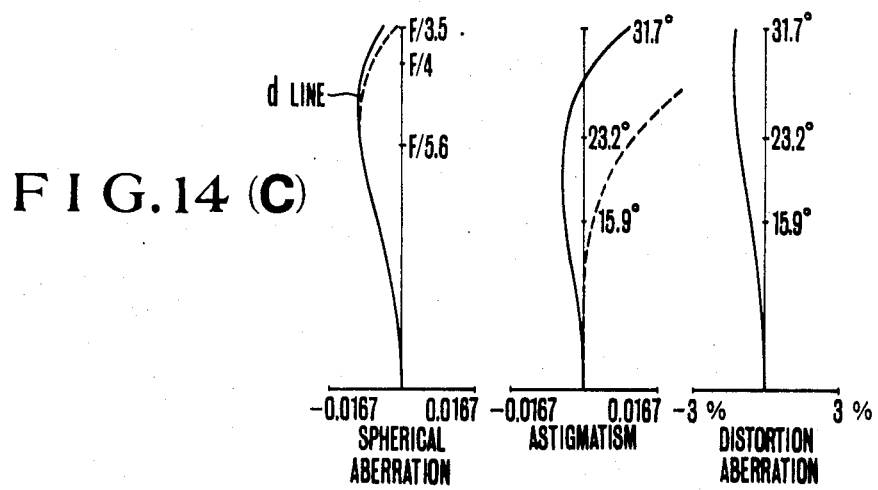

The second example of the objective of the invention is shown in FIGS. 9 and 11 for lens configuration when focused respectively to an infinitely distant object and to a close object at a distance corresponding to a magnification of −0.0750 and in FIGS. 10 and 12 for aberration curves. A conventional objective according to the same data of Table 2 but having no focusing provision of the invention is shown in FIG. 13 for lens configuration when focused to a close object at the distance of −0.0750 in magnification, and in FIG. 14 for aberration curves.

Table 1

| f = 1.0 – 1.446 | | f-number: F/3.5 | | Image angle: 43° – 31.7° |
|---|---|---|---|---|
| No. | R | D | N | V |
| 1 | 3.2115 (Aspheric) | 0.095 | $N_1 = 1.72342$ | $V_1 = 38.0$ |
| 2 | 1.1852 | 0.5181 | | |
| 3 | −15.4421 | 0.3173 | $N_2 = 1.61293$ | $V_2 = 37.0$ |
| 4 | −3.0004 | Variable | | |
| 5 | −6.8545 | 0.0826 | $N_3 = 1.77250$ | $V_3 = 49.7$ |
| 6 | 0.9439 | 0.1545 | $N_4 = 1.71736$ | $V_4 = 29.5$ |
| 7 | 1.2252 | 0.2483 | | |
| 8 | 1.4981 | 0.1735 | $N_5 = 1.64769$ | $V_5 = 33.8$ |
| 9 | 7.7341 | Variable | | |
| 10 | 6.7011 | 0.1025 | $N_6 = 1.60729$ | $V_6 = 59.4$ |
| 11 | −2.7381 | 0.0041 | | |
| 12 | 1.0158 | 0.1917 | $N_7 = 1.60311$ | $V_7 = 60.7$ |
| 13 | 2.2543 | 0.2045 | | |
| 14 | Diaphragm | 0.0620 | | |
| 15 | 1.3796 | 0.2087 | $N_8 = 1.60311$ | $V_8 = 60.7$ |
| 16 | −8.3856 | 0.0574 | | |
| 17 | −1.4125 | 0.0620 | $N_9 = 1.80518$ | $V_9 = 25.4$ |
| 18 | 1.0237 | 0.0946 | | |
| 19 | 1.0330 | 0.0203 | $N_{10} = 1.70154$ | $V_{10} = 41.1$ |
| 20 | −0.9233 (Aspheric) | | | |

Lens Separation during Zooming with Object at Infinity

| f | d9 |
|---|---|
| 1. | 0.847 |
| 1.157 | 0.518 |
| 1.446 | 0.999 |

Lens Separation during Focusing at the Wide Angle Position

| Magnification | D4 |
|---|---|
| 0 | 0.1322 |
| −0.0777 | 0.021 |

Equation for aspheric surfaces R1 and R20:

$$X = \frac{\frac{h^2}{R}}{1 + \sqrt{1 - (\frac{h}{R})^2}} + Ah^2 + Bh^4 + Ch^6 + Dh^8 + \ldots$$

Figuring constants for R1:  R = 3.2115
A = 0
B = 8.3 × 10⁻³
C = 4.8 × 10⁻⁴
D = 0

Figuring constants for R20:  R = −0.9233
A = 0
B = 6 × 10⁻²⁰
C = −2.0 × 10⁻²
D = 0

Table 2

| f = 1.0 – 1.3957 | | F/3.5 | | Image Angle: 43° – 31.7° |
|---|---|---|---|---|
| No. | R | D | N | V |

Table 2-continued

| | | | | |
|---|---|---|---|---|
| 1 | 3.2470 (Aspheric) | 0.0944 | $N_1 = 1.62299$ | $V_1 = 58.2$ |
| 2 | 1.0209 | 0.3799 | | |
| 3 | 3.1130 | 0.1567 | $N_2 = 1.64769$ | $V_2 = 33.8$ |
| 4 | 6.4607 | Variable | | |
| 5 | 6.6371 | 0.0784 | $N_3 = 1.60311$ | $V_3 = 60.7$ |
| 6 | 0.8955 | 0.2023 | | |
| 7 | 1.0039 | 0.1731 | $N_4 = 1.74400$ | $V_4 = 44.8$ |
| 8 | 1.7733 | Variable | | |
| 9 | 2.2349 | 0.0915 | $N_5 = 1.60311$ | $V_5 = 60.7$ |
| 10 | 20.7110 | 0.0123 | | |
| 11 | 1.3610 | 0.1108 | $N_6 = 1.60311$ | $V_6 = 60.7$ |
| 12 | 6.4370 | 0.1494 | | |
| 13 | Diaphragm | 0.1272 | | |
| 14 | 2.5071 | 0.1567 | $N_7 = 1.60311$ | $V_7 = 60.7$ |
| 15 | −2.0822 | 0.0800 | | |
| 16 | −0.8254 | 0.0981 | $N_8 = 1.62004$ | $V_8 = 36.3$ |
| 17 | 1.5565 | 0.0821 | | |
| 18 | −2.4972 | 0.0410 | $N_9 = 1.80518$ | $V_9 = 25.4$ |
| 19 | 6.5140 | 0.1231 | $N_{10} = 1.71300$ | $V_{10} = 53.9$ |
| 20 | −0.9081 | 0.0082 | | |
| 21 | −5.9850 | 0.1096 | $N_{11} = 1.80610$ | $V_{11} = 40.9$ |
| 22 | −1.604 | | | |

Lens Separation during
Focusing at the Wide Angle Position

| Magnification | d4 |
|---|---|
| 0 | 0.1621 |
| −0.0750 | 0.0123 |

Lens Separation during
Zooming with Object at Infinity

| f | d8 |
|---|---|
| 1.0 | 0.8411 |
| 1.1489 | 0.5147 |
| 1.3957 | 0.0985 |

Figuring constants for aspheric surface R1:

$$R = 3.3470$$
$$A = 0$$
$$B = 3.2 \times 10^{-2}$$
$$C = -1.83 \times 10^{-3}$$
$$D = 4.1 \times 10^{-3}$$

What is claimed is:

1. A variable magnification optical system comprising, from front to rear in the direction in which light enters said system from the object side, a first lens component of negative power and a second lens component of positive power which remains stationary during focusing with an axial air separation between said first and said second components being variable to effect variation of magnification of an object, said first component is divided into a rear lens group of negative power and a front lens group, said front lens group including at least one positive lens and at least one negative lens with the positive lens disposed closest to an image plane in the front lens group, the absolute value of the focal length of said front lens group being larger than that of the focal length of either said rear lens group or said second component, said front and said rear lens groups being movable so that when said first lens component is axially moved toward the front to focus down to shorter object distances, the axial air separation between said front and said rear groups is decreased from that occurring before the focusing operation is performed.

2. A variable magnification optical system comprising a front lens group, a middle lens group of negative power, and a rear lens group of positive power, said front lens group being formed by at least one positive lens and at least one negative lens with the positive lens disposed closest to an image plane in the front lens group, the absolute value of the focal length of said front lens group being larger than those of the focal lengths of said middle lens group and said rear lens group, said front lens group being constructed so that light flux incident upon said front lens group parallel to the optical axis of the optical system exits from said front lens group approximately parallel to said optical axis, the refractive power of the combination of said front lens group and said middle lens group being negative, said front lens group and said middle lens group being movable in unison for zooming, said rear lens group being movable for zooming in a different manner from that in which said front lens group and said middle lens group are moved for zooming, and said front lens group and said middle lens group being movable for focusing in such a manner that when said front lens group and said middle lens group are moved simultaneously toward the front to effect focusing down to shorter object distances, the amount of movement of said front lens group is smaller than that of movement of said middle lens group.

* * * * *

UNITED STATES PATENT OFFICE
CERTIFICATE OF CORRECTION

Patent No. 4,099,846           Dated July 11, 1978

Inventor(s) Naoto Kawamura, A. Tajima, et al

It is certified that error appears in the above-identified patent and that said Letters Patent are hereby corrected as shown below:

In the heading of the patent [75] should read as follows:

[75] Inventors: Naoto Kawamura, Tokyo; Akira Tajima, Kanagawa-ken; Katumi Tanaka, Tokyo, all of Japan Signed and Sealed this Sixteenth Day of January 1979

[SEAL]

Attest:

RUTH C. MASON  
Attesting Officer

DONALD W. BANNER  
Commissioner of Patents and Trademarks